Aug. 5, 1930.                A. W. CAPS                1,771,994
NONCORROSIBLE BEARING
Filed Dec. 28, 1927

INVENTOR
*Arthur W. Caps*
BY
*his* ATTORNEYS

Patented Aug. 5, 1930

1,771,994

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

NONCORROSIBLE BEARING

Application filed December 28, 1927. Serial No. 243,083.

The present embodiment of the invention is directed in part toward providing a bearing of few and simple parts, which can be easily constructed and assembled, and will prevent the ingress of injurious substances to the contacting surfaces thereof, and which effectively retains any lubricant placed in contact with the bearing surfaces.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The present embodiment of the invention provides a construction of the class described, of a simple and durable form which can be manufactured at small cost, being particularly advantageous for use with a conveying structure in connection with chemicals which have a corrosive or other injurious or detrimental action upon the contacting surfaces of the bearing. To this end the invention as disclosed is embodied in a two-part bearing casing provided with suitable antifriction means for a rotary shaft or the like, and including means for retaining a lubricant in covering relation to the contacting surfaces of the bearing.

Figure 1:
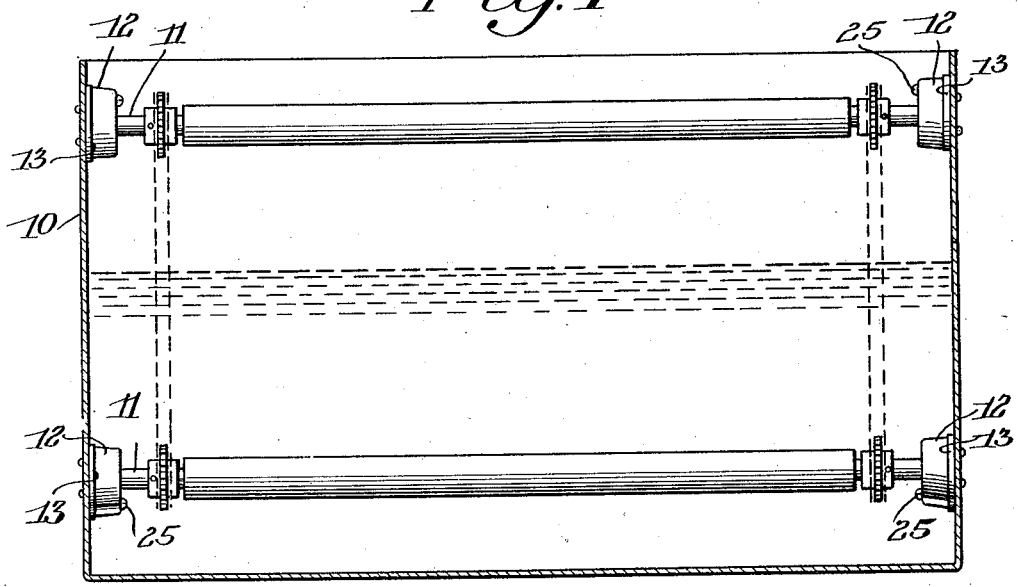
Fig. 1 is a sectional view of a tank illustrating a conveyer therein having combined therewith bearing members embodying the present invention.
Figure 2:
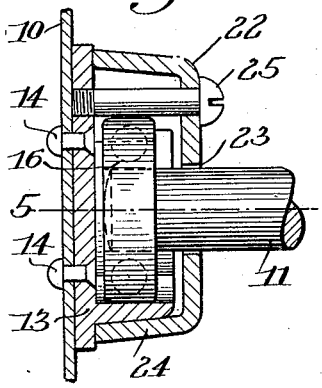
Fig. 2 is a vertical section of the bearing construction taken on line 2—2 of Fig. 4 illustrating the parts in assembled relation.
Figure 3:
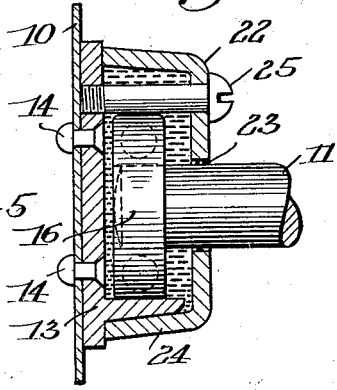
Fig. 3 is a view similar to Fig. 2 showing the lubricant in place within the bearing casing.
Figure 4:
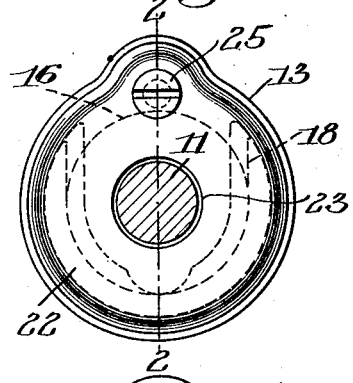
Fig. 4 is an end view of the bearing casing illustrating the shaft in section.

Referring more particularly to the drawings, there is shown at 10 in Fig. 1 a tank for containing a suitable chemical solution, such as "hypo" for use in connection with the fixing of photographic prints. Within the casing is disposed conveying means comprising a pair of shafts 11, 11 on which may be arranged the conveying elements for conducting the photographic prints through the solution. The shafts 11, 11 are journalled at their ends in bearings designated as a whole as at 12.

While it is within the province of the present invention to provide a bearing either intermediate the ends of a shaft or at the end thereof, for the purposes of illustration the bearing has been shown as embracing the end of the shaft. The bearings 12 in the present embodiment of the invention comprises a base member 13, as best shown in Fig. 6, which is secured to the walls of the tank 10 in any suitable manner, the securing means being herein shown as rivets 14, which are preferably countersunk at the inner surface of the base member in order to provide a smooth inner shell for the bearing.

Figure 5:
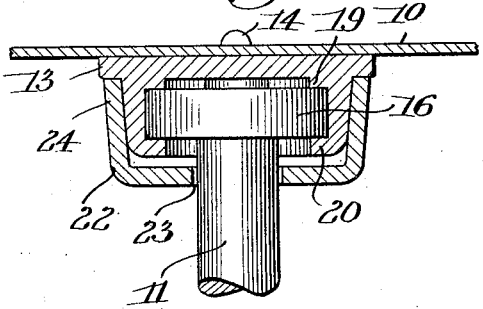
Fig. 5 is a horizontal sectional view taken substantially on line 5—5 of Fig. 2.

The base member 13 is preferably provided with engaging means thereon such as an outstanding flange 15 which provides a seat for engaging suitable anti-friction means, herein shown in the form of a ball race 16. As best shown in Figs. 5 and 6, the flange element 15 is open at one side as at 17, which may be disposed in any direction, for the insertion of the ball race radially therein. For the purpose of preventing axial movement of the ball race relatively to the base member 13, the flange element 15 is provided with a depressed inner face 18, having at opposite sides thereof shoulder portions 19 and 20 which engage or abut the outer face of the ball race near its periphery.

Figure 6:
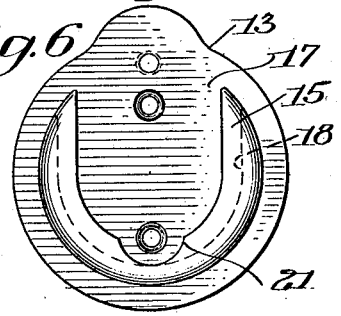
Fig. 6 is a detail view of the front side of the base member of the casing.

In order to facilitate the assembly of the base member on to the wall of the tank 10, the shoulder 20 is suitably cut away as shown at 21 adjacent the lower rivet 14, see Fig. 6, so that this rivet may be readily inserted without interference by the construction of the bearing and without liability of the riveting tools injuring the bearing.

It is found desirable and necessary for the efficient operation of the bearing to prevent ingress of the chemicals to the contacting surfaces of the bearing, and for this purpose there is provided means whereby the bearing surfaces may be covered with a lubricant and for retaining such lubricant in position. In the present instance, a cover member 22 is provided, having a central opening 23 therein for the passage of shaft 11 therethrough and having a flange or collar 24, in the present instance shown as somewhat tapered, which preferably snugly embraces the flange element 15 of the base members.

Suitable means are provided for holding the cover 22 in place against the face element 13. For this purpose there is provided a bolt 25 which passes through a suitable aperture in the cover and is threaded into the base member 13. Thus when the bolt is secured into position the head thereof engages the outer face of the cover and holds it firmly on the base element.

For the purpose of preventing any radial outward movement of the ball race 16 the bolt 25 is preferably located so that the intermediate portion thereof is disposed substantially in contacting relation with the periphery of the ball race, and at a point adjacent the opening 17 of the flange 15. Thus if the ball race has a tendency to be displaced due to the rotation of the shaft 11, the bolt 25 will effectively prevent such movement. The inner portion of the bearing within the cover 22 is filled with any suitable lubricant such as hard grease.

In assembling the parts, the cover 22 is slipped onto the shaft and the ball race is next placed in position at the end. While the cover is on the shaft it may be filled with hard grease, and after the grease has been inserted, the shaft is moved into position so that the ball race slides edgewise within the opening 17 and into place in the depressed face 18 of the flange element 15. At this point in the assembly the cover 22, with the grease contained therein, is slid along the shaft and pressed into position against the base member with the flange portion 24 thereof surrounding the flange 15 of the base member. This will force the hard grease to all parts of the bearing, so as to thoroughly cover the ball bearing elements within the ball race 16, and effectively prevent the entrance of any corrosive liquid from the tank into the bearing. After the cover has been placed in position, the bolt 25 will be inserted through the aperture in the cover and screwed into the threaded opening in the base element, thus holding the cover immovably to the base element and at the same time preventing any movement of the ball race elements away from its seat within the flange 15.

It will be apparent from the foregoing description that the present invention provides a durable and efficient bearing construction particularly applicable for use with injurious, corrosive chemicals, which if allowed to come into contact with the inner bearing surfaces, would in a short time so corrode the contacting surfaces as to render them practically useless by greatly increasing the friction on the moving parts. In the present embodiment of the invention the lubricant is effectively retained within the two-part casing which prevents the liquid chemicals from entering the bearing even when it is submerged below the surface of the liquid. The present construction has the further advantages of being adapted to be quickly taken apart and assembled for the replenishment of the lubricant, and the single fastening means for holding the parts of the casing together effectively serves additionally as a means for preventing displacement of the anti-friction means which surrounds the shaft.

I claim as my invention:

1. In a bearing construction, the combination with a base member having an attaching wall and an outstanding supporting flange thereon, of a ball race supported on said flange, a cover plate cooperating with said base member to form a lubricant chamber, and a shaft extending through the cover plate only and supported in the ball race, the cover plate being provided with a fastening element contacting with the top of the ball race to maintain it against the flange.

2. In a bearing construction, the combination with a base member having an attaching wall and an outstanding supporting flange thereon provided with a U-shaped recess open at the top, of a ball race supported on the flange and adapted to be inserted and removed laterally through the opening in the recess and also to be held against axial movement by the walls thereof, a cover plate secured to the base member to form a lubricant chamber, and a shaft extending through one of the members and supported in the ball race.

3. In a bearing construction, the combination with a base member having an attaching wall and an outstanding supporting flange thereon provided with a U-shaped recess open at the top, of a ball race supported on the flange and adapted to be inserted and removed laterally through the opening in the recess and also to be held against axial movement by the walls thereof, a cover plate secured to the base member and cooperating with the flange thereof on its closed sides, a fastener for the cover plate adapted also to engage and hold the ball race in the recess, and a shaft extending through one of the enclosing members and supported in the ball race.

4. In a bearing construction, the combination with a pair of oppositely arranged supports, of base members having attaching walls secured to the respective supports and each provided with an outstanding supporting flange thereon provided with a U-shaped recess open at the top, a ball race supported on each flange and adapted to be inserted and removed laterally through the opening in the recess and also to be held against axial movement by the walls thereof, a cover plate detachably secured to each base member to form a lubricant chamber, and a shaft extending through the cover plates and supported in the ball races to be lifted out laterally therewith when the cover plates are loosened and slid back on the shaft.

5. In a bearing construction, the combination with a base member having an outstanding U-shaped flange internally grooved, of a ball race seated in the groove of said flange at the closed end thereof and removable by movement in a radial direction through the open end of said flange, a cover member embracing said flange externally and having means associated therewith for limiting such radial movement of said ball race, and a shaft extending through one of said members and supported in said ball race.

6. In a bearing construction, the combination with a base member having an outstanding U-shaped flange internally grooved, and externally tapered, of a ball race seated in the groove of said flange at the closed end thereof and removable by movement in a radial direction through the open end of said flange, a cover member embracing said flange externally, said cover member being internally tapered to correspond with the external taper of said flange to fit snugly thereon, and a shaft extending through one of said members and supported in said ball race.

ARTHUR W. CAPS.